(12) United States Patent
Coldicott et al.

(10) Patent No.: US 9,026,412 B2
(45) Date of Patent: *May 5, 2015

(54) MANAGING AND MAINTAINING SCOPE IN A SERVICE ORIENTED ARCHITECTURE INDUSTRY MODEL REPOSITORY

(75) Inventors: Peter A. Coldicott, Jonestown, TX (US); Eoin Lane, Littleton, MA (US); Magda M. Mourad, Yorktown Heights, NY (US); Harry T. Pendergrass, Aloha, OR (US); Mei Y. Selvage, Pocatello, ID (US)

(73) Assignee: International Business Machines Corporation, Armonk, NY (US)

( * ) Notice: Subject to any disclaimer, the term of this patent is extended or adjusted under 35 U.S.C. 154(b) by 1346 days.

This patent is subject to a terminal disclaimer.

(21) Appl. No.: 12/640,852

(22) Filed: Dec. 17, 2009

(65) Prior Publication Data

US 2011/0153293 A1    Jun. 23, 2011

(51) Int. Cl.
*G06G 7/48*    (2006.01)
*G06Q 10/06*    (2012.01)

(52) U.S. Cl.
CPC ...................................... *G06Q 10/06* (2013.01)

(58) Field of Classification Search
USPC .............................................................. 703/6
See application file for complete search history.

(56) References Cited

U.S. PATENT DOCUMENTS

| | | |
|---|---|---|
| 5,970,490 A | 10/1999 | Morgenstern |
| 6,256,773 B1 | 7/2001 | Bowman-Amuah |
| 6,292,932 B1 | 9/2001 | Baisley et al. |
| 6,300,947 B1 | 10/2001 | Kanevsky |
| 6,363,353 B1 | 3/2002 | Chen |
| 6,377,934 B1 | 4/2002 | Chen et al. |
| 6,381,743 B1 | 4/2002 | Mutschler, III |
| 6,411,961 B1 | 6/2002 | Chen |
| 6,539,396 B1 | 3/2003 | Bowman-Amuah |
| 6,658,644 B1 | 12/2003 | Bishop et al. |
| 6,684,386 B1 | 1/2004 | Baisley |
| 6,789,252 B1 | 9/2004 | Burke et al. |
| 6,799,174 B2 | 9/2004 | Chipman et al. |
| 7,080,064 B2 | 7/2006 | Sundaresan |
| 7,099,859 B2 | 8/2006 | Sundaresan |
| 7,103,871 B1 | 9/2006 | Kirkpatrick et al. |
| 7,225,241 B2 | 5/2007 | Yada |

(Continued)

FOREIGN PATENT DOCUMENTS

WO    2007113164    10/2007

OTHER PUBLICATIONS

Chapter 3. Integration Services; Enterprise Knowledge Infrastructures; 2005, 147-224, DOI: 10.1007/3-540-27514-2_3; pp. 147-224.*

(Continued)

*Primary Examiner* — Hugh Jones
(74) *Attorney, Agent, or Firm* — Patents on Demand P.A.; Brian K. Buchheit; Scott M. Garrett

(57) ABSTRACT

A method of managing and maintaining scope in a of service oriented architecture industry model repository comprising defining boundaries and definitions of scope and scope propagation of topics, associations, and occurrences within the SOA IMR; managing boundaries and definitions of scope and scope propagation within the SOA IMR; and maintaining boundaries and definitions of scope and scope propagation within the SOA IMR.

18 Claims, 6 Drawing Sheets

(56) References Cited

U.S. PATENT DOCUMENTS

| | | |
|---|---|---|
| 7,284,196 B2 | 10/2007 | Skeen et al. |
| 7,313,575 B2 | 12/2007 | Carr et al. |
| 7,318,055 B2 | 1/2008 | Britton et al. |
| 7,366,706 B2 | 4/2008 | Chang et al. |
| 7,412,457 B2 | 8/2008 | Saracco et al. |
| 7,428,582 B2 | 9/2008 | Bean et al. |
| 7,483,973 B2 | 1/2009 | An et al. |
| 7,526,501 B2 | 4/2009 | Albahari et al. |
| 7,546,295 B2 | 6/2009 | Brave et al. |
| 7,630,877 B2 | 12/2009 | Brown et al. |
| 7,698,398 B1 | 4/2010 | Lai |
| 7,711,836 B2 | 5/2010 | Videlov et al. |
| 7,716,279 B2 | 5/2010 | Savchenko et al. |
| 7,761,406 B2 | 7/2010 | Harken |
| 7,761,533 B2 | 7/2010 | Angelov |
| 7,769,877 B2 | 8/2010 | McBride et al. |
| 7,792,868 B2 | 9/2010 | Finkelstein et al. |
| 7,865,820 B2 | 1/2011 | Sauer et al. |
| 7,890,517 B2 | 2/2011 | Angelo et al. |
| 7,979,840 B2 | 7/2011 | Zhang et al. |
| 7,987,163 B2 | 7/2011 | Keshavarz-Nia et al. |
| 8,001,129 B2 | 8/2011 | Arumainayagam et al. |
| 8,010,947 B2 | 8/2011 | Carbone et al. |
| 8,015,541 B1 | 9/2011 | Srinivasan et al. |
| 8,024,425 B2 | 9/2011 | Stoyanova |
| 8,074,117 B2 | 12/2011 | Wolf et al. |
| 8,156,179 B2 | 4/2012 | Parmar et al. |
| 8,229,881 B2 | 7/2012 | Pedro et al. |
| 8,234,387 B2 | 7/2012 | Bradley et al. |
| 8,244,768 B2 | 8/2012 | Lane et al. |
| 8,301,490 B2 | 10/2012 | Cornford |
| 8,341,155 B2 | 12/2012 | Lane |
| 8,346,929 B1 | 1/2013 | Lai |
| 8,566,358 B2 | 10/2013 | Lane et al. |
| 8,607,190 B2 | 12/2013 | Coldicott et al. |
| 8,631,071 B2 | 1/2014 | Coldicott et al. |
| 8,631,072 B2 | 1/2014 | Damola et al. |
| 8,645,904 B2 | 2/2014 | Coldicott et al. |
| 8,726,236 B2 | 5/2014 | Coldicott et al. |
| 8,775,462 B2 | 7/2014 | Coldicott et al. |
| 2002/0059566 A1 | 5/2002 | Delcambre et al. |
| 2002/0069102 A1 | 6/2002 | Vellante et al. |
| 2002/0073106 A1 | 6/2002 | Parker et al. |
| 2002/0087315 A1 | 7/2002 | Lee et al. |
| 2002/0116389 A1 | 8/2002 | Chen et al. |
| 2002/0129329 A1 | 9/2002 | Nishioka et al. |
| 2002/0194053 A1 | 12/2002 | Barrett et al. |
| 2003/0009740 A1 | 1/2003 | Lan |
| 2003/0135825 A1 | 7/2003 | Gertner et al. |
| 2003/0158851 A1 | 8/2003 | Britton et al. |
| 2003/0172368 A1 | 9/2003 | Alumbaugh et al. |
| 2003/0177481 A1 | 9/2003 | Amaru et al. |
| 2003/0229529 A1 | 12/2003 | Mui et al. |
| 2003/0233339 A1 | 12/2003 | Downs |
| 2003/0233631 A1 | 12/2003 | Curry et al. |
| 2004/0158815 A1 | 8/2004 | Potgieter |
| 2004/0172612 A1 | 9/2004 | Kasravi et al. |
| 2004/0193476 A1 | 9/2004 | Aerdts |
| 2005/0044197 A1 | 2/2005 | Lai |
| 2005/0050311 A1 | 3/2005 | Joseph et al. |
| 2005/0050549 A1 | 3/2005 | Joseph et al. |
| 2005/0114829 A1 | 5/2005 | Robin et al. |
| 2005/0138113 A1 | 6/2005 | Brendle et al. |
| 2005/0144829 A1 | 7/2005 | Gonzalez |
| 2005/0154662 A1 | 7/2005 | Langenwalter |
| 2005/0154769 A1 | 7/2005 | Eckart et al. |
| 2005/0166178 A1 | 7/2005 | Masticola et al. |
| 2005/0182744 A1 | 8/2005 | Kawabata et al. |
| 2005/0262191 A1 | 11/2005 | Mamou et al. |
| 2005/0268326 A1 | 12/2005 | Bhargavan et al. |
| 2005/0278202 A1 | 12/2005 | Broomhall et al. |
| 2006/0004774 A1 | 1/2006 | Alcorn |
| 2006/0015489 A1 | 1/2006 | Probst et al. |
| 2006/0047810 A1 | 3/2006 | Herzog et al. |
| 2006/0053174 A1 | 3/2006 | Gardner et al. |
| 2006/0070083 A1 | 3/2006 | Brunswig et al. |
| 2006/0074980 A1 | 4/2006 | Sarkar |
| 2006/0106804 A1 | 5/2006 | Chande |
| 2006/0106824 A1 | 5/2006 | Stuhec |
| 2006/0129440 A1 | 6/2006 | Frauenhoffer et al. |
| 2006/0174222 A1 | 8/2006 | Thonse et al. |
| 2006/0206883 A1 | 9/2006 | Sabbouh |
| 2006/0229896 A1 | 10/2006 | Rosen et al. |
| 2006/0236307 A1 | 10/2006 | Debruin et al. |
| 2006/0241931 A1 | 10/2006 | Abu el Ata et al. |
| 2007/0038610 A1 | 2/2007 | Omoigui |
| 2007/0043632 A1 | 2/2007 | Abelow |
| 2007/0073663 A1 | 3/2007 | McVeigh et al. |
| 2007/0088683 A1 | 4/2007 | Feroglia et al. |
| 2007/0094219 A1 | 4/2007 | Kipersztok |
| 2007/0106629 A1 | 5/2007 | Endacott et al. |
| 2007/0112712 A1 | 5/2007 | Flinn et al. |
| 2007/0112803 A1 | 5/2007 | Pettovello |
| 2007/0156726 A1 | 7/2007 | Levy |
| 2007/0168479 A1 | 7/2007 | Bean et al. |
| 2007/0179983 A1 | 8/2007 | Putman |
| 2007/0233681 A1 | 10/2007 | Ronen et al. |
| 2007/0239768 A1 | 10/2007 | Quinn-Jacobs |
| 2007/0260476 A1 | 11/2007 | Smolen et al. |
| 2007/0261027 A1 | 11/2007 | Dhanakshirur et al. |
| 2007/0271277 A1 | 11/2007 | Ivan et al. |
| 2008/0052314 A1 | 2/2008 | Batabyal |
| 2008/0059630 A1 | 3/2008 | Sattler et al. |
| 2008/0091283 A1 | 4/2008 | Balci et al. |
| 2008/0091448 A1 | 4/2008 | Niheu et al. |
| 2008/0114700 A1 | 5/2008 | Moore et al. |
| 2008/0126397 A1 | 5/2008 | Alexander et al. |
| 2008/0127047 A1 | 5/2008 | Zhang et al. |
| 2008/0133558 A1 | 6/2008 | Carlson et al. |
| 2008/0134137 A1 | 6/2008 | Petersen |
| 2008/0178147 A1 | 7/2008 | Meliksetain et al. |
| 2008/0215358 A1 | 9/2008 | Goldszmidt et al. |
| 2008/0215400 A1 | 9/2008 | Ban et al. |
| 2008/0229195 A1 | 9/2008 | Brauel et al. |
| 2008/0235664 A1 | 9/2008 | Carbone et al. |
| 2008/0255892 A1 | 10/2008 | Orangi et al. |
| 2008/0270372 A1 | 10/2008 | Hsu et al. |
| 2008/0288944 A1 | 11/2008 | Coqueret et al. |
| 2008/0313282 A1 | 12/2008 | Warila et al. |
| 2008/0319947 A1 | 12/2008 | Latzina et al. |
| 2009/0018996 A1 | 1/2009 | Hunt et al. |
| 2009/0063522 A1 | 3/2009 | Fay et al. |
| 2009/0064087 A1 | 3/2009 | Isom |
| 2009/0077043 A1 | 3/2009 | Chang et al. |
| 2009/0089078 A1 | 4/2009 | Bursey |
| 2009/0094112 A1 | 4/2009 | Cesarini et al. |
| 2009/0106234 A1 | 4/2009 | Siedlecki et al. |
| 2009/0109225 A1 | 4/2009 | Srivastava et al. |
| 2009/0112908 A1 | 4/2009 | Wintel et al. |
| 2009/0132211 A1 | 5/2009 | Lane et al. |
| 2009/0138293 A1 | 5/2009 | Lane et al. |
| 2009/0150860 A1 | 6/2009 | Gschwind et al. |
| 2009/0157630 A1 | 6/2009 | Yuan |
| 2009/0157801 A1 | 6/2009 | Barber et al. |
| 2009/0158237 A1 | 6/2009 | Zhang et al. |
| 2009/0182610 A1 | 7/2009 | Palanisamy et al. |
| 2009/0182750 A1 | 7/2009 | Keyes et al. |
| 2009/0193057 A1 | 7/2009 | Maes |
| 2009/0193432 A1 | 7/2009 | McKegney et al. |
| 2009/0201917 A1 | 8/2009 | Maes et al. |
| 2009/0204467 A1 | 8/2009 | Rubio et al. |
| 2009/0204662 A1 | 8/2009 | Meo |
| 2009/0210390 A1 | 8/2009 | Lane |
| 2009/0228425 A1 | 9/2009 | Goraya |
| 2009/0248705 A1 | 10/2009 | Ivan et al. |
| 2009/0254572 A1 | 10/2009 | Redlich et al. |
| 2009/0254876 A1 | 10/2009 | Kuriakose et al. |
| 2009/0281996 A1 | 11/2009 | Liu et al. |
| 2009/0313335 A1 | 12/2009 | Heidasch |
| 2009/0319981 A1 | 12/2009 | Akkiraju et al. |
| 2010/0057677 A1 | 3/2010 | Rapp et al. |
| 2010/0058113 A1 | 3/2010 | Rapp et al. |
| 2010/0077386 A1 | 3/2010 | Akkiraju et al. |
| 2010/0082387 A1 | 4/2010 | Cao et al. |

(56) References Cited

U.S. PATENT DOCUMENTS

| | | |
|---|---|---|
| 2010/0106656 A1 | 4/2010 | Sheth et al. |
| 2010/0145774 A1 | 6/2010 | Veshnyakov et al. |
| 2010/0146617 A1 | 6/2010 | Betts et al. |
| 2010/0161629 A1 | 6/2010 | Palanisamy et al. |
| 2010/0174693 A1 | 7/2010 | Chandrasekhara et al. |
| 2010/0228693 A1 | 9/2010 | Dawson et al. |
| 2010/0250497 A1 | 9/2010 | Redlich et al. |
| 2010/0269099 A1 | 10/2010 | Yoshimura et al. |
| 2010/0312731 A1 | 12/2010 | Knoblauch |
| 2011/0035391 A1 | 2/2011 | Werner et al. |
| 2011/0099050 A1 | 4/2011 | Coldicott et al. |
| 2011/0099139 A1 | 4/2011 | Coldicott et al. |
| 2011/0099207 A1 | 4/2011 | Brown et al. |
| 2011/0099532 A1 | 4/2011 | Coldicott et al. |
| 2011/0099536 A1 | 4/2011 | Coldicott et al. |
| 2011/0119223 A1 | 5/2011 | Lane |
| 2011/0153292 A1 | 6/2011 | Lane et al. |
| 2011/0153293 A1 | 6/2011 | Coldicott et al. |
| 2011/0153608 A1 | 6/2011 | Lane et al. |
| 2011/0153610 A1 | 6/2011 | Carrato et al. |
| 2011/0153636 A1 | 6/2011 | Coldicott et al. |
| 2011/0153767 A1 | 6/2011 | Coldicott et al. |
| 2011/0202326 A1 | 8/2011 | Salemann |
| 2011/0238610 A1 | 9/2011 | Lee et al. |
| 2012/0023042 A1 | 1/2012 | Das et al. |
| 2013/0086061 A1 | 4/2013 | Lane et al. |

OTHER PUBLICATIONS

Oracle Enterprise Repository Harvester User Guide 1 Og Release 3 (10.3); Jul. 2009; pp. 1-34.*
IBM: Best Practices for SAP Business Information Warehouse on DB2 UDB for z/Os V8; ibm redbooks; May 2005; pp. 1-286.*
Ahmed et al.; An Introduction to Topic Maps; The Architecture Journal, Microsoft, Jul. 2005, pp. 1-15.*
Chen, D-W. et al.; "A P2P based Web service discovery mechanism with bounding deployment and publication"; Chinese Journal of Computers; vol. 28; No. 4; pp. 615-626; Apr. 2005, only abstract and p. 10 are translated.
Lee, J. et al.; "Semantic and Dynamic Web Service of SOA bsed Smart Robots using Web 2.0 Open API", 2008; Sixth International Conference on Software Engineering, Research, Management, and Application; pp. 255-260.
Demirkan, H. et al.; "Service-oriented technology and management: Perspectives on research and practice for the coming decade"; Electronic Commerce Research and Applications vol. 7 Issue 4; Jan. 2008; pp. 356-376.
Zdun, U. et al.; "Modeling Process-Driven and Service-Oriented Architectures Using Patterns and Pattern Primitives"; ACM Transactions on the Web; vol. 1 No. 3 Article 14; Sep. 2007; 44 pages.
Simoes, B. et al.; "Enterprise-level Architecture For Interactive Web-based 3D Visualization Of Geo-referenced Repositories"; Association for Computing Machinery Inc. 978-1-60558-432-4/09/0006; Jun. 2009; pp. 147-154.
Kanakalata et al; Performance Opitimization of SOA based AJAX Application; 2009; pp. 89-93.
Annett et al.; "Building Highly-Interactive, Data-Intensive, REST Applications: The Invenio Experience"; 2008; pp. 1-15.
Arnold et al.; "Automatic Realization of SOA Deployment Patterns in Distributed Environments"; ICSOC 2008; LNCS 5364; 2008; pp. 162-179.
U.S. Appl. No. 12/605,635. filed Oct. 26, 2009, Coldicott et al.
U.S. Appl. No. 12/605,660, filed Oct. 26, 2009, Coldicott et al.
Justin Kelleher, "A Reusable Traceability Framework Using Patterns", University of Cape Town, ACM Digital Library, 2005, pp. 50-55.
Sharples et al., "The Design and Implementation of a Mobile Learning Resource", Educational Technology Research Group, University of Birmingham, ACM Digital Library, 2002, pp. 1-23.
Min Luo, "Tutorial 1: Common Business Components and Services Toward More Agile and Flexible Industry Solutions and Assets", 2008 IEEE Congress on Services Part II, pp. 11-12.
Ying Huang et al., "A Stochastic Service Composition Model for Business Integration", Proceeds of the International Conference on Next Generation Web Services Practices, 2005 IEEE Computer Society, pp. 1-8.
Pham et al., "Analysis of Visualisation Requirements for Fuzzy Systems", 2003 ACM, pp. 181-187.
U.S. Appl. No. 12/605,562, filed Oct. 26, 2009, Coldicott et al.
Building SOA applications with reusable assets, Part 1: Reusable assets, recipes, and patterns, "http://www.microsofttranslator.com/BV.aspx?ref=IE8Activity&a=http%3A%2F%2Fwww.ibm.com%2Fdeveloperworks%2Fcn%2Fwebservices%2Fws-soa-reuse1%2F", 2006; 9 pages.
Building SOA applications with reusable assets, Part 2: SOA recipe reference example, "http://www.microsofttranslator.com/BV.aspx?ref=IE8Activity&a=http%3A%2F%2Fwww.ibm.com%2Fdeveloperworks%2Fcn%2Fwebservices%2Fws-soa-reuse2%2F", 2006, 10 pages.
Building SOA applications with reusable assets, Part 3: WS response template mode, "http://www.microsofttranslator.com/BV.aspx?ref=IE8Activity&a=http%3A%2F%2Fwww.ibm.com%2Fdeveloperworks%2Fcn%2Fwebservices%2Fws-soa-reuse3%2F", 2007, 15 pages.
"System and Method for Distributed Web Service Adaptation using Aspect oriented Programming", IBM Technical Disclosure Bulletin, Sep. 15, 2008, pp. 1-3.
Baum et al., "Mapping Requirements to Reusable Components using Design Spaces", 2000, Proceedings 4th International Conference on Requirements Engineering, pp. 159-167.
Hsiung et al., "VERTAF: An Application Framework for the Design and Verification of Embedded Real-Time Software", IEEE Transactions on Software Engineering, vol. 30, No. 10, Oct. 2004, pp. 656-674.
Robinson et al., "Finding Reusable UML Sequence Diagrams Automatically", IEE Software, 2004, pp. 60-67.
Jin et al., "Automated Requirements Elicitation: Combining a Model-Driven Approach with Concept Reuse", International Journal of Software Engineering and Knowledge Engineering, vol. 13, No. 1, 2003, pp. 53-82.
Dinesh et al., Oracle Enterprise Repository, User Guide, 10g Release 3 (10.3), Jul. 2009, Oracle Corporation, pp. 1-89.
The Moose Book: Subject, model, meta-model, meta-meta-model, http://www.themoosebook/internals/fame/subject-model-meta-model, Copyright 2010-2011, pp. 1-3.
van den Heuvel, Willem-Jan Papazoglou, and Manfred A. Jeusfeld "Configuring business objects from legacy systems." Advanced Information Systems Engineering. Springer Berlin Heidelberg, 1999, 16 Pages.
Ryan, Kevin and Brian Mathews. "Matching conceptual graphs as an aid to requirements re-use. "Requirements Engineering, 1993; Proceedings of IEEE International Symposium on IEEE, 1993, 9 Pages.
Wilde, Norman, et al.; "A comparison of methods for locating features in legacy software." Journal of Systems and Software 65.2 (2003): 105-114.
Heckel, Reiko, et al. "Architectural transformations: From legacy to three-tier and services." Software Evolution. Springer Berlin Heidelberg, 2008. 139-170.
Papazoglou, Mike P. And Willem-Jan van den Heuvel. "Configurable business objects for building evolving enterprise models and applications." Business Process Management. Springer Berlin Heidelberg, 2000. 328-344.
Bieberstein, Norbert, Robert G. Laird, and Keith Jones. Executing SOA: a practical guide for the service-oriented architect. IBM Press, 2008. In Two Parts—total is 214 Pages.
Pepper, Steve. "The Tao of topic maps", Proceedings of XML Europe. vol. 3, 2000, 77 Pages.
Hatzigaidas, Athanasios, et al. "Topic Map Existing Tools; A Brief Review", ICTAMI 2004 (International Conference on Theory and Applications of Mathematics and Informatics). 2004, 17 Pages.
Le Grand, Benedicte, and Michel Soto, "Visualisation of the semantic web: Topic Maps Visualization." Information Visualization, 2002. Proceedings, Sixth International Conference on. IEEE, 2002, 6 Pages.

(56) References Cited

OTHER PUBLICATIONS

Sam Hunting et al. "XML topic maps: creating and using topic maps", Jul. 16, 2002, 498 Pages.

Web and Semantic Web Query Languages: A survey, James Bailey et al., Lecture Notes in Computer Science, vol. 3564 (2005) pp. 35-133, 2005.

A. Rauschmayer and P. Renner, Knowledge-Representation-Based Software Engineering, Technical Report 0407, Ludwig-Maximilians-Universitat Munchen, Institut fur Informatik, May 2004, 20 Pages.

Bieberstein, Norbert, Robert G. Laird, and Keith Jones. Executing SOA; a practical guide for the service-oriented architect. IBM Press, 2008. In Two Parts—Total is 214 Pages.

Volzer, Hagen, et al. "A tool for subsystem configuration management, "Software Maintenance, 2002. Proceedings, International Conference on, IEEE, 2002, 9 Pages.

Sadiq, Shazia, and Maria Orlowska. "Architectural considerations in systems supporting dynamic workflow modification." Proceedings of the workshop on Software Architectures for Business Process Management at CAISE. vol. 99. 1999, 10 Pages.

Sadiq, Wasim, and Maria Orlowska. "Analyzing process models using graph reduction techniques." Information systems 25.2: 117-134 (2000).

Sadiq, Wasim, and Maria Orlowska. "Applying graph reduction techniques for identifying structural conflicts in process models. "Advanced Information Systems Engineering. Springer Berlin Heidelberg. 1999, 15 Pages.

Knodel, Preparing the Organizational 'Soil' for Measurable and Sustainable change: Business Value Management and Project Governance Journal of Change Management, vol. 4, No. 1, 45-62, Mar. 2004 (Received Jun. 2003).

Prosci's Change Management Maturity Model Prosci 2004, 8 Pages.
The Development of a Best Practice Model for Change Management European Management Journal vol. 15, No. S, pp. 537-545, 1997.

U.S. Appl. No. 12/640,624; Notice of Allowance dated Feb. 28, 2014; Final Rejection dated Aug. 29, 2013; Non Final Rejection dated Feb. 8, 2013; Non Final Rejection dated May 7, 2012; Non Final Rejection dated Oct. 11, 2011.

U.S. Appl. No. 12/640,697; Notice of Allowance dated Mar. 30, 2012 and Non Final Rejection dated Oct. 5, 2011.

U.S. Appl. No. 13/533,007; Final Rejection dated May 23, 2014; Non Final Office Action dated Sep. 6, 2013.

U.S. Appl. No. 12/605,635; Final Rejection dated Oct. 10, 2013 and Non-Final Office Action dated Dec. 20, 2012.

U.S. Appl. No. 12/604,751; Notice of Allowance dated Aug. 2, 2013 and Non Final Rejection dated Dec. 6, 2012.

U.S. Appl. No. 13/911,260; Final Rejection dated Jan. 5, 2011 and Non Final Rejection dated Apr. 19, 2010.

U.S. Appl. No. 12/640,697; Notice of Allowance dated Aug. 13, 2011 and Non Final Rejection dated Dec. 8, 2011.

U.S. Appl. No. 12/605,660; Notice of Allowance dated Sep. 27, 2013 and Final Rejection dated Nov. 7, 2012 and Non-Final Rejection dated Dec. 16, 2011.

U.S. Appl. No. 12/605,562; Notice of Allowance dated Dec. 31, 2013 and Non Final Rejection dated Jun. 5, 2013 and Non Final Rejection dated Dec. 6, 2012.

U.S. Appl. No. 11/942,191; Non Final Rejection dated Mar. 4, 2011.

U.S. Appl. No. 11/944,946; Final Rejection dated May 14, 2012; Non Final Rejection dated Nov. 2, 2011; Non Final Rejection dated Jun. 10, 2011.

Maicher et al. ("Temporal Qualification in Topic Maps", Fifth International Conference on Topic Maps Research and Applications, TMRA 2009 Leipzig, Germany, Nov. 12-13, 2009, 16 Pages.

Stefanova et al. "Viewing and Querying Topic Maps in terms of RDF", SeMMA 2008 CEUR Workshop Proceedings, ISSN 1613-0073, online at CEUR-Ws.org/Vol-346/, 15 Pages.

R. Hopkins et al.; "Eating the IT Elephant: Moving from Greenfield Development to Brownfield"; Chapter 6; 23 pages.

Pu et al; Combining MDE and UML to Reverse Engineer Web-Based Legacy System; IEEE; 2008; pp. 718-725.

R. Barrett; "Model Driven Design of Distribution Patterns for Web Service Compositions", 2006; School of Computing; 4 pages.

Gamatie et al.; "Operational Semantics of the Marte Repetitive Structure Modeling Concepts for Data-Parallel Applications Design", 2010 Ninth International Symposium on Parallel and Distributed Computing; IEEE; 2010 pp. 25-32.

Smeda et al.; "Cosasfudio: A Software Architecture Modeling Tool", World Academy of Science, Engineering and Technology; 2009; pp. 263-266.

Moroff et al. "OpenArchitectureWare 4.1 RSM/RSA Adapter" www.openarchitecture.org 2009-2010; pp. 1-7.

U.S. Appl. No. 12/640,865; Notice of Allowance dated Sep. 3, 2013; Non Final Rejection dated Oct. 11, 2012.

U.S. Appl. No. 12/034,508; Non Final Office Action dated Apr. 19, 2010; Final Rejection dated Jan. 6, 2011.

U.S. Appl. No. 13/011,260; Notice of Allowance dated Aug. 13, 2012; Non Final Rejection dated Dec. 8, 2011.

\* cited by examiner

MANAGING AND MAINTAINING SCOPE IN A SERVICE ORIENTED ARCHITECTURE INDUSTRY MODEL REPOSITORY

BACKGROUND OF THE INVENTION

The present invention relates to meta models, and more specifically to managing and maintaining scope in a service oriented architecture industry model repository.

Enterprises are adopting a model-driven development (MDD) approach to architecting and designing both the business architecture and the supporting IT system and applications. In order to promote the best practices and interoperability between industry participants both product vendors and industry associations are aggressively developing and making available analysis and design frameworks or industry models to support the model-driven development approach. The frameworks are targeted towards vertical industries and tend to be very complex.

For successful adoption of the complex industry models, scoping capability for both strategic and tactical purposes is important. In enterprise wide projects, it is important to provide users project-level model views that match their roles and needs. For example, a project manager may want to clearly view the specific scope of requirement that belong to his/her project while developers may want to view the specific elements of design-level models, such as services or data structures from which they will work, without being burdened with having to sift through the entire model to find those elements.

Typically industry associations are not concerned with specific tooling or usage methods and therefore do not provide any scoping aids. Any scoping that is provided is limited and based on explicit inputs and relationships and does not leverage any level of semantic technologies.

SUMMARY OF THE INVENTION

A method of managing and maintaining scope in a of service oriented architecture industry model repository is provided comprising defining boundaries and definitions of scope and scope propagation of topics, associations, and occurrences within the SOA IMR; managing boundaries and definitions of scope and scope propagation within the SOA IMR; and maintaining boundaries and definitions of scope and scope propagation within the SOA IMR.

The method may further comprise creating a new meta model topic, association, or occurrence and topic, association, or occurrence name for the requirement model; creating a scope topic, association, or occurrence to identify that the new meta model topic, association, or occurrence is in the scope of the meta model; adding the scope topic, association, or occurrence to the topic, association, or occurrence name of the new meta model topic; creating resource description framework triples of the new meta model topic, association, or occurrence; and creating scope dependent uniform resource identifiers from the topic, association, or occurrence name for uniquely identifying the resource description framework triples created.

The scoping may be, but is not limited to inheritance scoping, industry vertical scoping, business scoping, and project scoping.

DETAILED DESCRIPTION OF THE INVENTION

Figure 1:
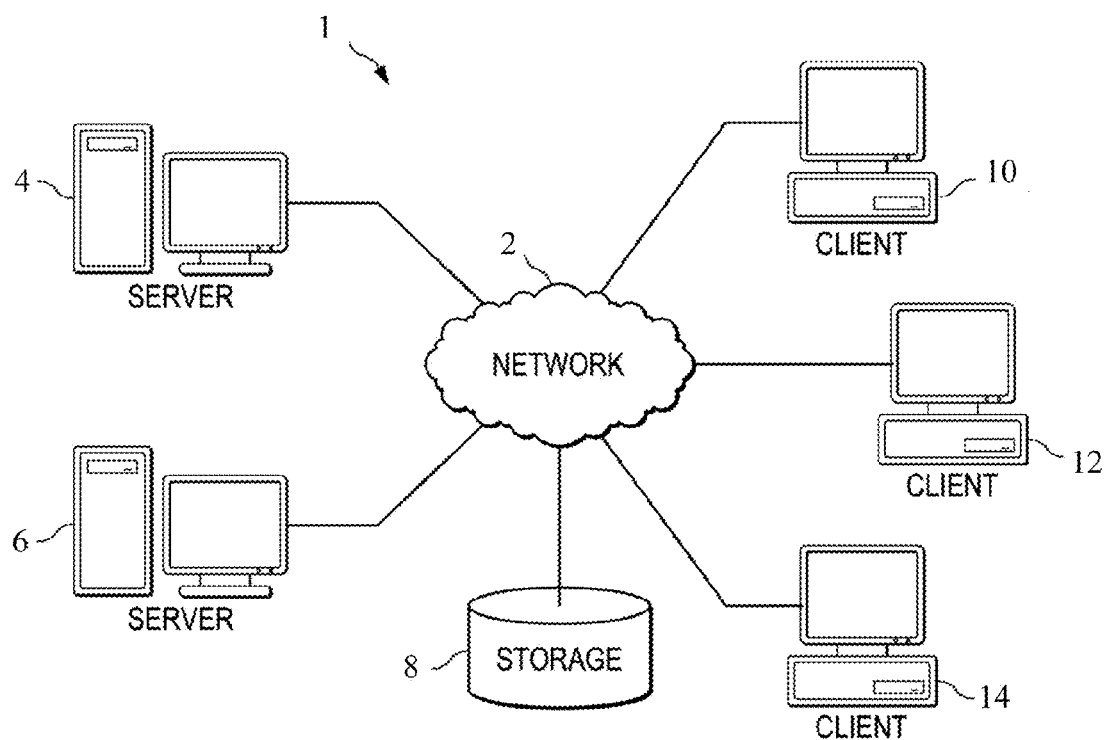
FIG. 1 is a computer network in which illustrative embodiments may be implemented.
Figure 2:
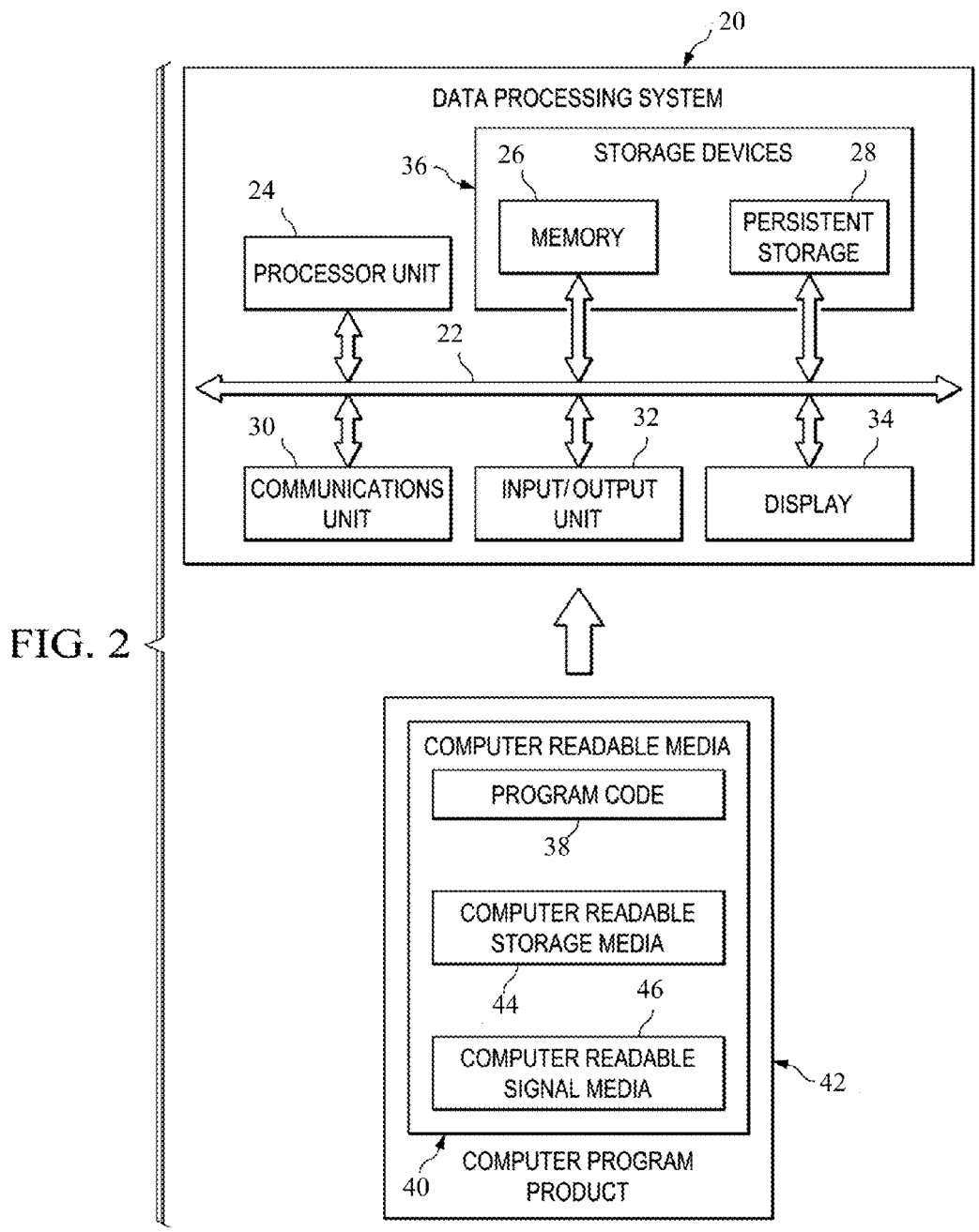
FIG. 2 is a data processing system in which illustrative embodiments may be implemented.

With reference now to the figures, and in particular, with reference to FIGS. 1 and 2, exemplary diagrams of data processing environments are provided in which illustrative embodiments may be implemented. It should be appreciated that FIGS. 1 and 2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 1 is a network of computers in which the illustrative embodiments may be implemented. Network data processing system 1 contains network 2, which is the medium used to provide communication links between various devices and computers connected together within network data processing system 1. Network 2 may include connections, such as wire, wireless communication links, or fiber optic cables.

In the depicted example, server 4 and server 6 connect to network 2 along with storage unit 8. In addition, clients 10, 12, and 14 connect to network 2. Clients 110, 12, and 14 may be, for example, personal computers or network computers. In the depicted example, server 4 provides information, such as boot files, operating system images, and applications to clients 10, 12, and 14. Clients 10, 12, and 14 are clients to server 4 in this example. Network data processing system 1 may include additional servers, clients, and other devices not shown.

Program code located in network data processing system 1 may be stored on a computer recordable storage medium and downloaded to a data processing system or other device for use. For example, program code may be stored on a computer recordable storage medium on server 4 and downloaded to client 10 over network 2 for use on client 10.

In the depicted example, network data processing system 1 is the Internet with network 2 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 1 also may be implemented as a number of different types of networks, such as, for example, an intranet, a local area network (LAN), or a wide area network (WAN). FIG. 1 is intended as an example, and not as an architectural limitation, for the different illustrative embodiments.

With reference now to FIG. 2, a block diagram of a data processing system is shown in which illustrative embodiments may be implemented. Data processing system 20 is an example of a computer, such as server 4 or client 10 in FIG. 1, in which computer usable program code or instructions implementing the processes may be located for the illustrative embodiments. In this illustrative example, data processing system 20 includes communications fabric 22, which provides communications between processor unit 24, memory 26, persistent storage 28, communications unit 30, input/output (I/O) unit 32, and display 34.

Processor unit 24 serves to execute instructions for software that may be loaded into memory 26. Processor unit 24 may be a set of one or more processors, or may be a multi-processor core, depending on the particular implementation. Further, processor unit 24 may be implemented using one or more heterogeneous processor systems in which a main processor is present with secondary processors on a single chip. As another illustrative example, processor unit 24 may be a symmetric multi-processor system containing multiple processors of the same type.

Memory 26 and persistent storage 28 are examples of storage devices 36. A storage device is any piece of hardware that is capable of storing information, such as, for example, without limitation, data, program code in functional form, and/or other suitable information either on a temporary basis and/or a permanent basis. Memory 26, in these examples, may be, for example, a random access memory or any other suitable volatile or non-volatile storage device. Persistent storage 28 may take various forms depending on the particular implementation. For example, persistent storage 28 may contain one or more components or devices. For example, persistent storage 28 may be a hard drive, a flash memory, a rewritable optical disk, a rewritable magnetic tape, or some combination of the above. The media used by persistent storage 28 also may be removable. For example, a removable hard drive may be used for persistent storage 28.

Communications unit 30, in these examples, provides for communications with other data processing systems or devices. In these examples, communications unit 30 is a network interface card. Communications unit 30 may provide communications through the use of either or both physical and wireless communication links.

Input/output unit 32 allows for input and output of data with other devices that may be connected to data processing system 20. For example, input/output unit 32 may provide a connection for user input through a keyboard, a mouse, and/or some other suitable input device. Further, input/output unit 32 may send output to a printer. Display 34 provides a mechanism to display information to a user.

Instructions for the operating system, applications, and/or programs may be located in storage devices 36, which are in communication with processor unit 24 through communications fabric 22. In these illustrative examples the instructions are in a functional form on persistent storage 28. These instructions may be loaded into memory 26 for running by processor unit 24. The processes of the different embodiments may be performed by processor unit 24 using computer implemented instructions, which may be located in a memory, such as memory 26.

These instructions are referred to as program code, computer usable program code, or computer readable program code, that may be read and run by a processor in processor unit 24. The program code in the different embodiments may be embodied on different physical or tangible computer readable media, such as memory 26 or persistent storage 28.

Program code 38 is located in a functional form on computer readable media 40 that is selectively removable and may be loaded onto or transferred to data processing system 20 for running by processor unit 24. Program code 38 and computer readable media 40 form computer program product 42 in these examples. In one example, computer readable media 40 may be in a tangible form, such as, for example, an optical or magnetic disc that is inserted or placed into a drive or other device that is part of persistent storage 28 for transfer onto a storage device, such as a hard drive that is part of persistent storage 28. In a tangible form, computer readable media 40 also may take the form of a persistent storage, such as a hard drive, a thumb drive, or a flash memory that is connected to data processing system 20. The tangible form of computer readable media 40 is also referred to as computer recordable storage media. In some instances, computer readable media 40 may not be removable.

Alternatively, program code 38 may be transferred to data processing system 20 from computer readable media 40 through a communications link to communications unit 30 and/or through a connection to input/output unit 32. The communications link and/or the connection may be physical or wireless in the illustrative examples. The computer readable media also may take the form of non-tangible media, such as communication links or wireless transmissions containing the program code.

In some illustrative embodiments, program code 38 may be downloaded over a network to persistent storage 28 from another device or data processing system for use within data processing system 20. For instance, program code stored in a computer readable storage medium in a server data processing system may be downloaded over a network from the server to data processing system 20. The data processing system providing program code 38 may be a server computer, a client computer, or some other device capable of storing and transmitting program code 38.

The different components illustrated for data processing system 20 are not meant to provide architectural limitations to the manner in which different embodiments may be implemented. The different illustrative embodiments may be implemented in a data processing system including components in addition to, or in place of, those illustrated for data processing system 20. Other components shown in FIG. 2 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 20 is any hardware apparatus that may store data. Memory 26, persistent storage 28 and computer readable media 40 are examples of storage devices in a tangible form.

In another example, a bus system may be used to implement communications fabric 22 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 26 or a cache such as found in an interface and memory controller hub that may be present in communications fabric 22.

Figure 3:
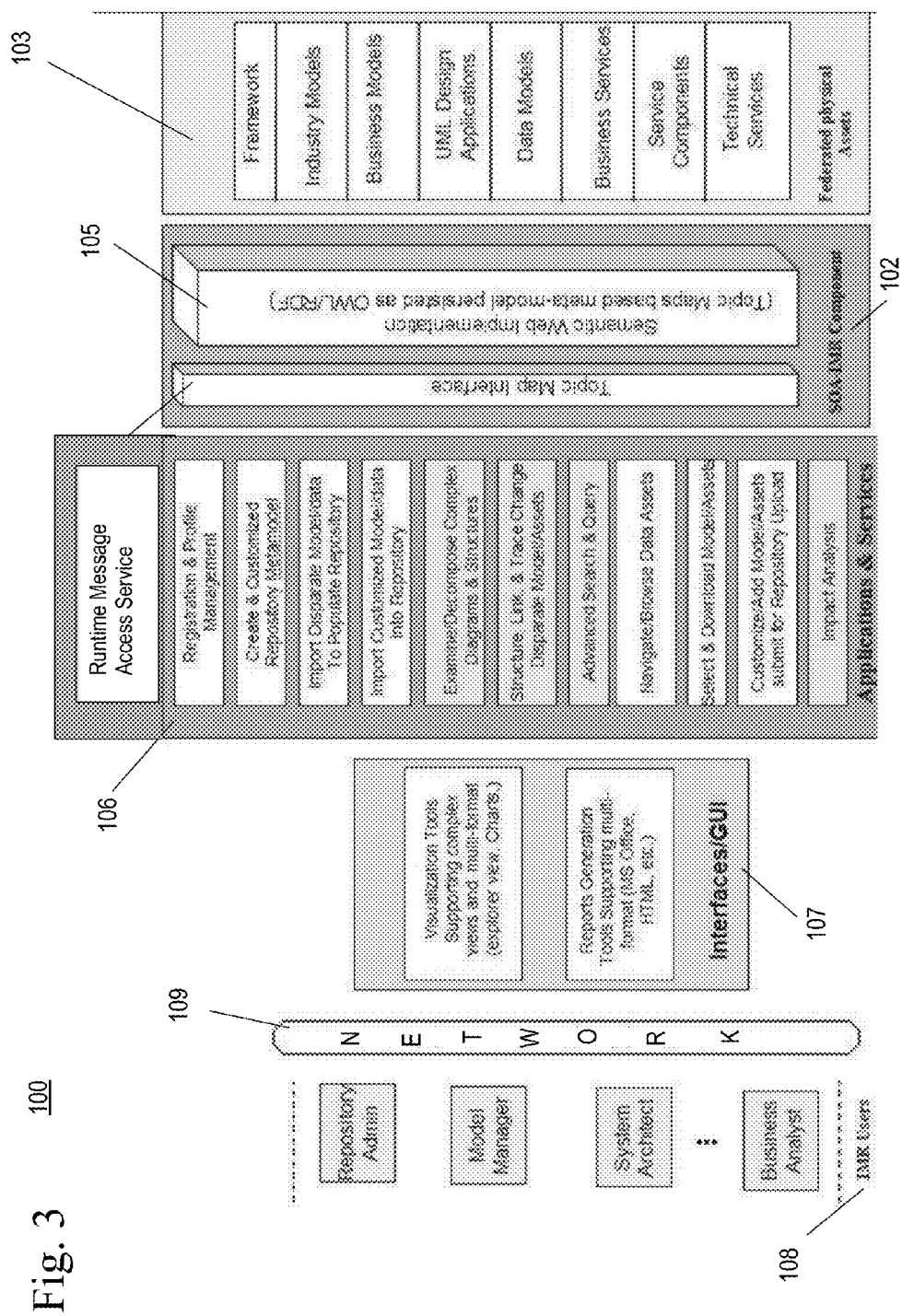
FIG. 3 shows an overview of an industry model repository (IMR) solution architecture system including a service oriented architecture (SOA) industry model repository (IMR) component.

FIG. 3 shows the IMR architecture system 100 which may be part of the network data processing system 1 shown in FIG. 1 and includes a service oriented architecture (SOA) industry model repository (IMR) component 102. The SOA-IMR component 102 provides tools to facilitate the consumption and reuse of the model assets through topic map IMR meta model creation and topic map interface 104 and semantic web implementation 105 which represent and implement the IMR meta models using semantics provide by the OWL language. The SOA IMR component 102 is discussed in further detail in an application entitled, "SERVICE ORIENTED ARCHITECTURE INDUSTRY MODEL REPOSITORY META-MODEL WITH A STANDARD BASED INDEX" filed concurrently with the present application. This application is hereby incorporated by reference. Block 105 is described in greater detail below.

The IMR architecture system 100 includes federated physical model assets 103 that are stored in different types of repositories depending on the model driven framework tools and products that are being deployed by the system. The federated physical assets may include framework, industry models, business models, UML design applications, data models, business services, service components, and technical services. The federated physical assets are not limited to the assets shown in FIG. 3.

Applications and services 106 are provided to IMR users 108 through the network 109 using interfaces 107. The interfaces used by the IMR users 108 includes reports generation and tools supporting multi-formats and visualization tools supporting complex views. The applications and services 106 may include registration and profile management; creating and customizing repository meta model, importing customized and disparate model/data into the depository, examining/decomposing complex diagrams and structures, structure, link, and trace change disparate model/assets; advanced search and query, navigate/browse data assets; select and download model/assets, customize/add models/assets submit for repository upload; and impact analysis. The application and services are not limited to the assets shown in FIG. 3. The applications and services are described in greater detail in applications entitled "FRAMEWORK TO POPULATE AND MAINTAIN A SERVICE ORIENTED ARCHITECTURE INDUSTRY MODEL", "IMPLEMENTING SERVICE ORIENTED ARCHITECTURE INDUSTRY MODEL REPOSITORY USING SEMANTIC WEB TECHNOLOGIES", "RECOGNITION OF AND SUPPORT FOR MULTIPLE VERSIONS OF AN ENTERPRISE CANONICAL MESSAGE MODEL" filed concurrently with the present application. These applications are hereby incorporated by reference. The interfaces 107 are further described in greater detail in an application entitled, "SERVICE ORIENTED ARCHITECTURE INDUSTRY MODEL REPOSITORY META-MODEL WITH A STANDARD BASED INDEX" filed concurrently with the present application and hereby incorporated by reference.

The IMR users 108 may include but are not limited to repository administrator, model manager, system architect, and business analyst.

Figure 4:
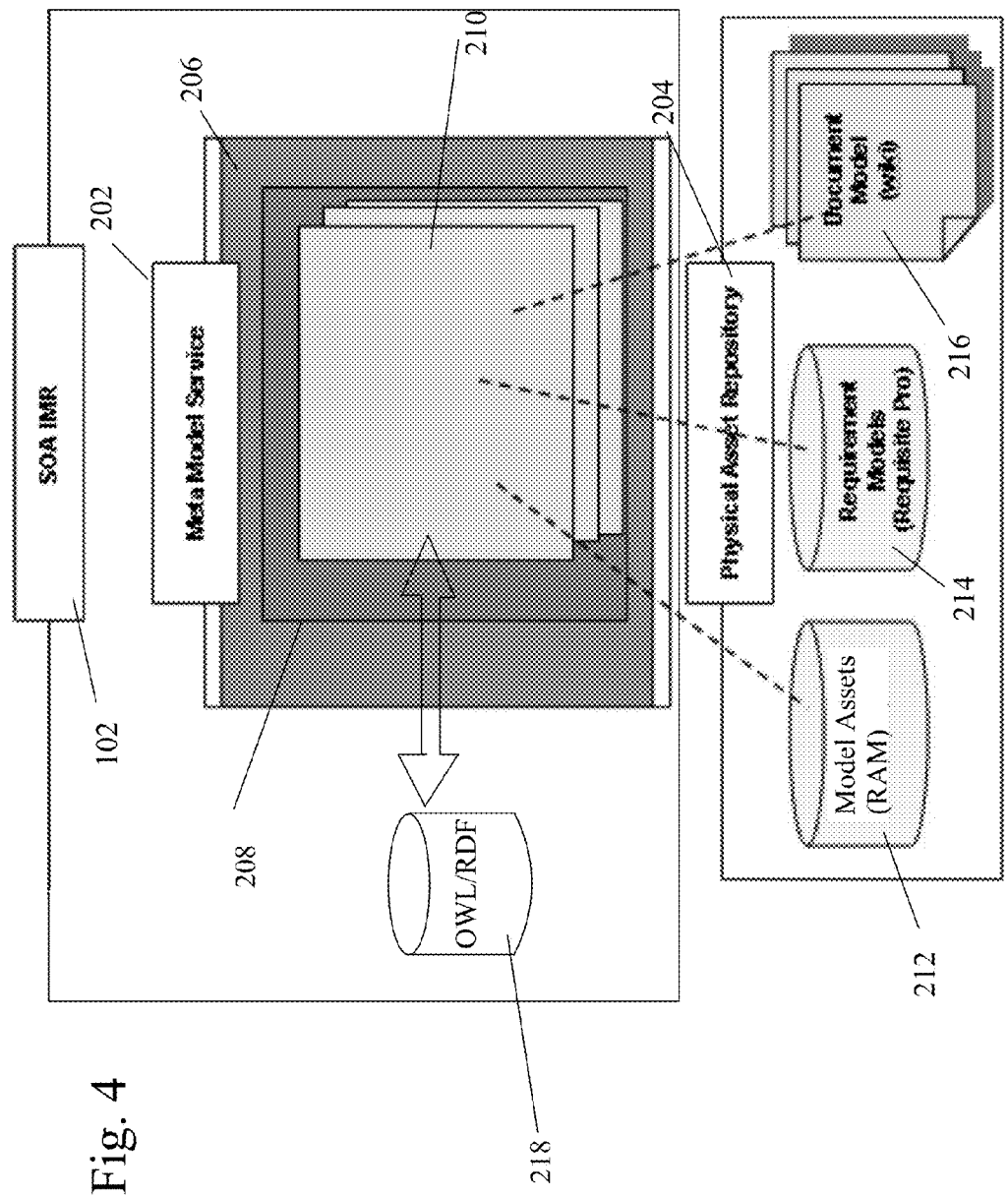
FIG. 4 shows an overview of a service oriented architecture (SOA) industry model repository (IMR) meta-model with OWL/RDF maps and vertical scoping.

FIG. 4 shows a service oriented architecture (SOA) industry model repository (IMR) component 102 in greater detail. The SOA IMR component 102 includes a meta model service 202 associated with the physical asset repository. Within the meta model service 202 is a meta-meta-meta model 206 with a topic map based index, an information model repository (IMR) common meta-meta model 208 describing the relationship between the included meta models and at least one topic map meta model 210 with data specific to a particular topic or industry vertical. The topic map meta model 210 is associated with the physical asset repository 204 of model assets which includes but is not limited to model assets (RAM) 212, requirement models 214, and document models (wiki) 216.

The internal meta model service 202 of the SOA IMR component 102 is the SOA IMR meta-model service using ISO Standard topic map meta models 210. Topic maps map both web and real-world information resources, by reifying real-world resources as "subjects", and creating "topic" constructs to capture their characteristics and relationships with other topics and subjects. By using the topic maps meta models 206, 208, and 210 as the repository internal meta model, a common meta model service interface 202 allows users to programmatically access, manage, and maintain these meta models.

The SOA IMR meta model service 202 maps or implements the ISO topic map meta models 210 to a web ontology language (OWL) representation of the topic map. The industry model repository (IMR) provides the context for the implementation of the ISO topic map meta models 210 to the OWL representation of the topic maps. The OWL representation of the topic map is stored in a resource description framework (RDF) semantic web repository 218. Scoping of the industry vertical or the topic map meta model 210 of the OWL representation of the topic map may occur.

In one embodiment of the present invention extends the service definition for the SOA IMR meta model service component with new fields and services for defining and managing multi-definitions of scope and scope propagation within the model constructs managed by the meta-model scoping service. The meta-model scoping service described below in detail, supports the industry model usage needs and is capable of defining scope and boundaries in the repository topic map meta model 210 and scope propagation through the captured relationships between multiple types of models.

In one embodiment of the present invention manages and maintains scope across boundaries in the industry model repository and can differentiate between different meta-models and artifacts. The scoping may be industry vertical scoping, inheritance scoping, business scoping and project scoping.

Industry vertical scoping identifies scope of Insurance versus Telco within topics (e.g. requirements, model assets), occurrences (e.g. web page or a URL to a RAS asset repository), and associations. In other words, distinguishing the differences in scope between the vertical industries.

Inheritance scoping identifies and scopes topics, occurrences and associations based on artifact inheritance relationships. For example, in Telco topics, identifying security identifier (SID) original artifacts versus a security identifier derived customized artifact.

Business scoping identifies and scopes topics, occurrences and associations based on business function areas, for example marketing versus procurement business scope.

Project scoping identifies and scopes topics, occurrences and associations based on project parameters or requirements.

The scoping may be queried directly from an artifact's explicit or implicit mapping. Explicit mappings occur when associations are created and stored in the industry model repository (IMR) Implicit mapping occur when the associations are derived based on inferences.

The scoping is not limited to the scoping listed above and may include other types of scoping as applicable.

Figure 5:
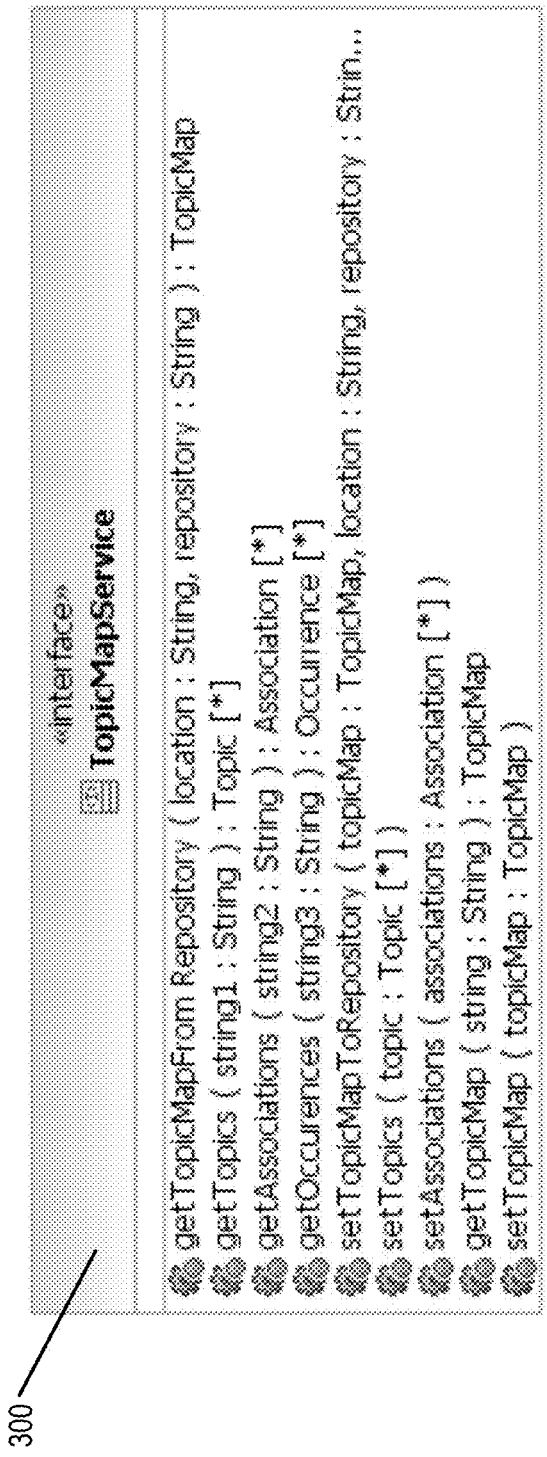
FIG. 5 shows a service model supporting scoping of the SOA IMR.

FIG. 5 shows a service model for SOA IMR with a meta-model scoping service. The service model includes a TopicMapService port and interface 300 with operations that include getting TopicMap From Repository, TopicMap, Topics, Associations, and Occurrences, and setting the TopicMap, TopicMap From Repository, Topics, and Associations.

Figure 6:
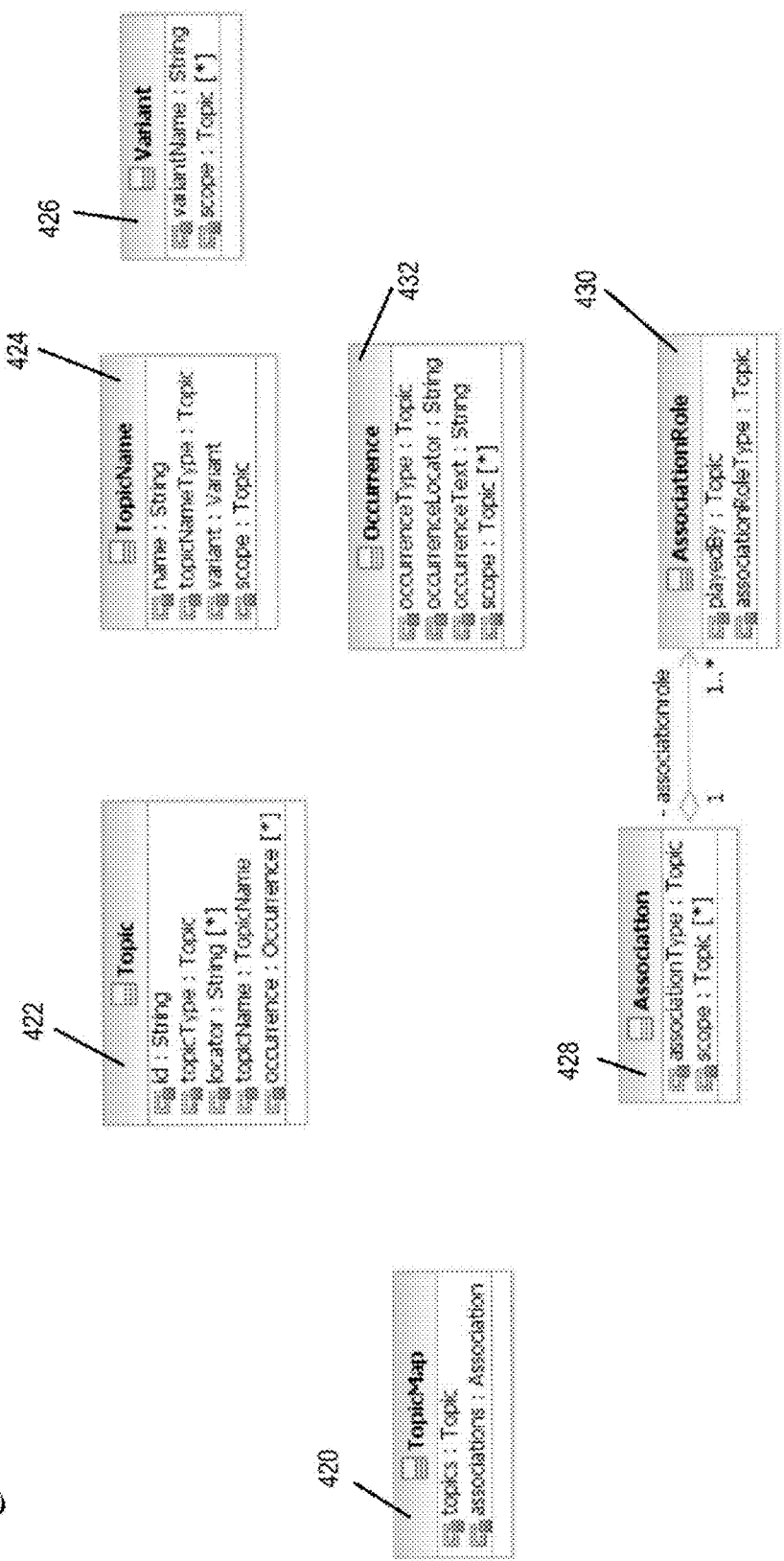
FIG. 6 shows a message model supporting scoping of the SOA IMR

FIG. 6 shows the message model for the SOA IMR with a meta-model scoping service. The messages pertain to TopicMap 420, Topic 422, TopicName 424, Association 428 and AssociationRole 430, Occurrence 432, and Variant 426. As shown in FIG. 4, TopicName 424, Occurrences 432 and Association 428 and AssociationRole 430 can each have scope.

New scope dependent topics may be created on the client side using a programming language such as Java™, a programming language from Sun MicroSystems Inc. For example, a new meta—model topic may be created for the requirements models. The user then creates a scope topic to identify that this topic is in the scope of the meta-model. Then the scope is added to the topic name. A similar approach may be used to create scope dependent associations and occurrences of topics as well.

The topic is created with the appropriate scope by persisting the new topic as a RDF triple. With the scope information defined for the requirement model and the RDF triples, scope dependent uniform resource identifier's (URI's) for uniquely identifying the triples are created. The scope information defined for the requirement model, the RDF triples, and the topic map constructs can also provide namespace data. If a topic cannot be created with a meaningful scope dependent URI, multiple scopes may be necessary and each scope would be added onto the based URI. A similar approach may be used to create scope dependent URI's for associations and occurrences of topics as well.

By using the ISO Standard of topic maps as the meta-meta model, the capability of automated index building is present. All of the topics are represented by index elements and these index elements can be limited by scope. The associations show which other topics a specific topic is related to and the occurrences show where physical assets relating to these topics may be found.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of one or more embodiments of the present invention may be written in an object oriented programming language such as Java, Smalltalk, C++ or the like. However, the computer program code for carrying out operations of one or more embodiments of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention for example as shown in FIGS. 1-6. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method of managing and maintaining scope in a service oriented architecture (SOA) industry model repository (IMR) comprising a meta model service associated with a physical asset repository including model assets, requirement models, and document models, the meta model service comprising: at least one topic map meta model with data specific to a particular topic or industry vertical included within an information model repository common meta-meta model, the information model repository common meta-meta model included within a meta-meta-meta model with a topic map based index, the method comprising:
   a) defining boundaries and definitions of scope and scope propagation of topics, associations, and occurrences within the SOA IMR;
   b) managing boundaries and definitions of scope and scope propagation within the SOA IMR; and
   c) maintaining boundaries and definitions of scope and scope propagation within the SOA IMR, wherein the scope is inheritance scoping.

2. The method of claim 1, wherein the method further comprises:
   creating a new meta model topic, association, or occurrence and topic, association, or occurrence name for the requirement model;
   creating a scope topic, association, or occurrence to identify that the new meta model topic, association, or occurrence is in the scope of the SOA IMR;
   adding the scope topic, association, or occurrence to the topic, association, or occurrence name of the new meta model topic;
   creating resource description framework triples of the new meta model topic, association, or occurrence; and
   creating scope dependent uniform resource identifiers from the topic, association, or occurrence name for uniquely identifying the resource description framework triples created.

3. The method of claim 1, wherein defining boundaries and definitions of scope and scope propagation within the SOA IMR further comprises differentiating between different meta models and artifacts within the meta model service of the SOA IMR.

4. The method of claim 1, wherein the scope is industry vertical scoping.

5. The method of claim 1, wherein the scope is business scoping.

6. The method of claim 1, wherein the scope is project scoping.

7. A computer system for a service oriented industry model repository architecture, the system comprising:
   a CPU, a computer readable memory, a non-transitory computer readable storage media, a plurality of service oriented architecture (SOA) industry model repositories (IMR) comprising a meta model service associated with a physical asset repository including model assets, requirement models, and document models, the meta model service comprising: at least one topic map meta model with data specific to a particular topic or industry vertical included within an information model repository common meta-meta model, the information model repository common meta-meta model included within a meta-meta-meta model with a topic map based index;
   first program instructions for defining boundaries and definitions of scope and scope propagation of topics, associations, and occurrences within the SOA IMR;
   second program instructions for managing boundaries and definitions of scope and scope propagation within the SOA IMR; and
   third program instructions for maintaining boundaries and definitions of scope and scope propagation within the SOA IMR;
   the first, second, and third program instructions are stored on the non-transitory computer readable storage media for execution by the CPU via the computer readable memory. wherein the scope is inheritance scoping.

8. The system of claim 7, wherein the system further comprises:
   fourth program instructions for creating a new meta model topic, association, or occurrence and topic, association, or occurrence name for the requirement model;
   fifth program instructions for creating a scope topic, association, or occurrence to identify that the new meta model topic, association, or occurrence is in the scope of the SOA IMR;
   sixth program instructions for adding the scope topic, association, or occurrence to the topic, association, or occurrence name of the new meta model topic;

seventh program instructions for creating resource description framework triples of the new meta model topic, association, or occurrence; and eighth program instructions for creating scope dependent uniform resource identifiers from the topic, association, or occurrence name for uniquely identifying the resource description framework triples created;

the fourth, fifth, sixth, seventh and eighth program instructions are stored on the non-transitory computer readable storage media for execution by the CPU via the computer readable memory.

9. The system of claim 7, wherein the first program instructions for defining boundaries and definitions of scope and scope propagation within the repository of internal meta model service data further comprises differentiating between different meta models and artifacts within the meta model service of the SOA IMR.

10. The system of claim 7, wherein the scope is industry vertical scoping.

11. The system of claim 7, wherein the scope is business scoping.

12. The system of claim 7, wherein the scope is project scoping.

13. A computer program product for a service oriented industry model repository architecture, the computer program product comprising:

a non-transitory computer readable storage media storing a plurality of computer readable memory, a plurality of service oriented architecture (SOA) industry model repositories (IMR) comprising a meta model service associated with a physical asset repository including model assets, requirement models, and document models, the meta model service comprising: at least one topic map meta model with data specific to a particular topic or industry vertical included within an information model repository common meta-meta model, the information model repository common meta-meta model included within a meta-meta-meta model with a topic map based index;

first program instructions for defining boundaries and definitions of scope and scope propagation of topics, associations, and occurrences within the SOA IMR;

second program instructions for managing boundaries and definitions of scope and scope propagation within the SOA IMR; and third program instructions for maintaining boundaries and definitions of scope and scope propagation within the SOA IMR;

the first, second, and third program instructions are stored on the non-transitory computer readable storage media, wherein the scope is inheritance scoping.

14. The computer program product of claim 13, wherein the computer program product further comprises:

fourth program instructions for creating a new meta model topic, association, or occurrence and topic, association, or occurrence name for the requirement model;

fifth program instructions for creating a scope topic, association, or occurrence to identify that the new meta model topic, association, or occurrence is in the scope of the SOA IMR;

sixth program instructions for adding the scope topic, association, or occurrence to the topic, association, or occurrence name of the new meta model topic;

seventh program instructions for creating resource description framework triples of the new meta model topic, association, or occurrence; and eighth program instructions for creating scope dependent uniform resource identifiers from the topic, association, or occurrence name for uniquely identifying the resource description framework triples created;

the fourth, fifth, sixth, seventh and eighth program instructions are stored on the non-transitory computer readable storage media for execution by the CPU via the computer readable memory.

15. The computer program product of claim 13, wherein the first program instructions for defining boundaries and definitions of scope and scope propagation within the repository of internal meta model service data further comprises differentiating between different meta models and artifacts within the meta model service of the SOA IMR.

16. The computer program product of claim 13, wherein the scope is industry vertical scoping.

17. The computer program product of claim 13, wherein the scope is business scoping.

18. The computer program product of claim 13, wherein the scope is project scoping.

* * * * *